(12) United States Patent
Bezryadin

(10) Patent No.: US 8,218,861 B2
(45) Date of Patent: *Jul. 10, 2012

(54) COLOR QUANTIZATION BASED ON DESIRED UPPER BOUND FOR RELATIVE QUANTIZATION STEP

(75) Inventor: Sergey N. Bezryadin, San Francisco, CA (US)

(73) Assignee: KWE International, Inc., South San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/111,527

(22) Filed: May 19, 2011

(65) Prior Publication Data

US 2011/0216970 A1 Sep. 8, 2011

Related U.S. Application Data

(63) Continuation of application No. 11/870,904, filed on Oct. 11, 2007, now Pat. No. 8,019,150.

(51) Int. Cl.
*G06K 9/00* (2006.01)
*G06K 9/36* (2006.01)
*G06K 9/38* (2006.01)
*G06K 9/46* (2006.01)
*G09G 5/02* (2006.01)

(52) U.S. Cl. ........ 382/162; 382/166; 382/251; 345/591; 345/604

(58) Field of Classification Search .................... None
See application file for complete search history.

(56) References Cited

U.S. PATENT DOCUMENTS

| | | | |
|---|---|---|---|
| 5,615,287 | A | 3/1997 | Fu et al. |
| 6,178,269 | B1 | 1/2001 | Acharya |
| 6,934,411 | B2 | 8/2005 | Bezryadin |
| 6,941,331 | B2 | 9/2005 | Bezryadin et al. |
| 7,031,404 | B2 | 4/2006 | Lindquist |
| 7,580,832 | B2 | 8/2009 | Allamanche et al. |
| 2004/0143380 | A1 | 7/2004 | Stam et al. |
| 2007/0154083 | A1 | 7/2007 | Bezryadin |
| 2008/0123942 | A1 | 5/2008 | Bezryadin |
| 2008/0240250 | A1 | 10/2008 | Lin et al. |

OTHER PUBLICATIONS

U.S. Appl. No. 11/377,591, filed Mar. 16, 2006, entitled "Editing (Including Saturation Editing) of Digital Color Images."
U.S. Appl. No. 11/494,393, filed Jul. 26, 2006, entitled "Editing of Digital Images, Including (But Not Limited To) Highlighting and Shadowing of Image Areas."

(Continued)

*Primary Examiner* — Li Liu
(74) *Attorney, Agent, or Firm* — Michael Shenker; Haynes and Boone, LLP

(57) ABSTRACT

A computer system processes encoded digital data representing an image at image portions. The image at each portion has color coordinates $S_1, S_2, S_3$ in a first color coordinate system (CCS), wherein $S_1\sqrt{T_1^2+T_2^2+T_3^2}$, $S_2=T_2/S_1$, $S_3=T_3/S_1$, wherein $T_1, T_2, T_3$ are color coordinates in a predefined 70%-orthonormal linear CCS. For each image portion whose color coordinate $S_1$ is in a predefined range, the encoded digital data comprise color coordinates $s_1, s_2, s_3$ such that: $s_1=k_B\cdot(\ln(\alpha S_1)+\beta)$ rounded to an integer, where $\alpha$ and $\beta$ are predefined constants, $s_2=k_{ef}S_2/S_1$ rounded to an integer, $s_3=k_{ef}S_3/S_1$ rounded to an integer, wherein $k_{ef}$ is about $3—k_B$, or $k_{ef}$ is equal to the smallest power of 2 which is greater than or equal to about $3\cdot k_B$. The processing comprises using the encoded digital data to perform editing, and/or displaying, and/or decoding the encoded data.

24 Claims, 2 Drawing Sheets

OTHER PUBLICATIONS

U.S. Appl. No. 11/432,221, filed May 10, 2006, entitled "Editing of Digital Images, Including (But Not Limited To) Color-To-Monochromatic Conversion and Changing the Color of Monochromatic Image."

U.S. Appl. No. 11/322,111, filed Dec. 28, 2005, entitled "Color Coordinate Systems Including Systems with a Coordinate Defined By A Square Root of A Quadratic Polynomial in Tristimulus Values and, Possibly, by a Sign of A Function Of One Or More Of Tristimulus Values."

U.S. Appl. No. 11/321,443, filed Dec. 28, 2005, entitled "Color Editing (Including Brightness Editing) Using Color Coordinate Systems Including Systems With a Coordinate Defined by a Square Root of a Quadratic Polynomial in Tristimulus Values and, Possibly, by a Sign of a Function of One or More of Tristimulus Values."

U.S. Appl. No. 11/377,161, filed Mar. 16, 2006, entitled "Editing (Including Contrast And Sharpness Editing) of Digital Images."

U.S. Appl. No. 11/376,837, filed Mar. 16, 2006, entitled "Editing (Including Hue Editing) of Digital Color Images."

MacAdam, "Orthogonal Color Matching Functions," Journal of Optical Society of America, 1954, vol. 44, pp. 713-724.

Cohen, Jozef "Two Preferred Reference Frames in Fundamental Color Space" Visual Color and Color Mixture: The Fundamental Color Space, Huguette Cohen, 2001, pp. 94-95, 100-103.

Pratt, William K., "Digital Image Processing—PIKS Inside ($3^{rd}$ Edition)" John Wiley & Sons, Inc. 2001, pp. 189-210.

Larson, Gregory Ward "The LogLuv Encoding for Full Gamut, High Dynamic Range Images," Silicon Graphics, Inc., no later than Nov. 2, 2006.

Xu, Ruifeng; Pattanaik, Sumanta N.; Hughes, Charles E. "High-Dynamic-Range Still-Image Encoding in JPEG 2000" IEEE Computer Society, IEEE Computer Graphics and Applications 2005, p. 69-76.

Mantiuk, Rafal; Myszkowski, Karol; Seidel, Hans-Peter "Lossy Compression of High Dynamic Range Images and Video" MPI INformatik, Stuhlsatzenhausweb 85, 66123 Saarbrucken, Germany, Jan. 2006.

Otim, Stephen O.; Jospeh, Dileepan; Choubey, Bhaskar; Collins, Steven "Modelling of High Dynamic Range Logarithmic CMOS Image Sensors" IMTC 2004—Instrumentation and Measurement Technology Conference, Como, Italy, May 18-20, 2004.

G. Yourganov, W. Stuerzlinger "Tone-Mapping for High Dynamic Range Images" Technical Report, Department of Computer Science, York University, Dec. 2001.

Ward, Greg "High Dynamic Range Image Encodings," May 21, 2001.

Spaulding, Kevin E.; Woolfe, Geoffrey J.; Giorgianni, Edward J. "Reference Input/Output Medium Metric RGB Color Encodings (RIMM/ROMM RGB)" PICS 2000 Conference, Mar. 26-29, 2000, Portland Oregon.

Morse, Bryan "Some Important Properties of Human Vision—CS450: Introduction to Digital Signal and Image Processing" BYU Computer Science, no later than Oct. 17, 2006.

Choo, Shuo-yen and Chew, Gregory "JPEG 2000 and Wavelet Compression" EE362 Stanford University, pp. 1-18, no later than Feb. 26, 2007.

U.S. Appl. No. 11/564,730, filed Nov. 29, 2006, entitled "Image Processing Including, But Not Limited to, Logarithimic Coding in Color Coordinate Systems Including Systems With a Coordinate Defined by a Square Root of a Quadratic Polynomial in Tristimulus Values and, Possibly, by a Sign of a Function of One or More of Tristimulus Values."

Wyszecki & Stiles, "Color Science; Concepts and Methods, Quantitative Data and Formulae" ($2^{nd}$ Ed. 2000), Section 5.4 (pp. 306-330; 793-803).

Bezryadin, Sergey; Bourov, Pavel, "Local Criterion of Quality for Color Difference Formula," International Conference on Printing Technology, St. Petersburg, Russia, Jun. 26-30, 2006, 5 pages.

Bezryadin, Sergey; Bourov, Pavel, "Color Coordinate Systems for Accurate Color Image Editing Software," International Conference on Printing Technology, St. Petersburg, Russia, Jun. 26-30, 2006, 4 pages.

S. Bezryadin, "LinLogBef File Format for HDR Image," IS&T/SID 15th Color Imaging Conference, p. 294-243, 2007.

S. Bezryadin, P. Burov, I. Tryndin, "Chromatic Coordinates in HDR Image Coding," IS&T/SPIE 20th Electronic Imaging, Proceedings of SPIE vol. 6817: Digital Photography IV, 68170W, 2008.

G. Ward Larson, "Overcoming Gamut and Dynamic Range Limitations in Digital Images," IS&T/SID 6th Color Imaging Conference, 1998.

P. Bourov and S. Bezryadin, "Analysis of Experimental Data Used for Development of CIE DE 2000 Color Difference Formula," IS&T Printing Technology SPb'06, 2006.

"Color Difference" Wikipedia, the free encyclopedia, 7 pages, Oct. 28, 2008.

Sergey Bezryadin, and Pavel Burov, "HDR Image Archiving Optimization," pp. 193-197, Bern, Switzerland, Jun. 2008, vol. 5, ISBN / ISSN: 978-0-892080277-3.

Wyszecki & Stiles, "Color Science" (2nd Ed. 2000), pp. 825-830.

COLOR QUANTIZATION BASED ON DESIRED UPPER BOUND FOR RELATIVE QUANTIZATION STEP

CROSS REFERENCE TO RELATED APPLICATIONS

The present application is a continuation of U.S. patent application Ser. No. 11/870,904, filed on Oct. 11, 2007, now U.S. Pat. No. 8,019,150 incorporated herein by reference.

BACKGROUND OF THE INVENTION

The present invention relates to digital image processing involving quantization of digital representations of color images.

Quantization involves reducing the set of colors available for image representation in order to reduce the size of the image data. Quantization errors should preferably be small so that image distortion would be imperceptible to a human observer. Hence, any two adjacent colors in the reduced set of colors should be indistinguishable to a human. At the same time, the reduced set of colors should itself be small in order to allow significant reduction in the image data size. These conflicting goals can be hard to balance if the quantization method must be suitable for a large gamut, e.g. the entire visible gamut (to be able to accommodate high dynamic range (HDR) images for example).

Each color can be represented by its coordinates in a color coordinate system (CCS), and each coordinate can be quantized separately. For this purpose, a reduced set of values can be defined for each coordinate. The color coordinate system can be chosen to provide luminance/chrominance separation, e.g. one coordinate for the luminance and two for the chrominance, with a larger reduced set for the luminance to accommodate high human sensitivity to luminance distortion.

The quantized image can be coded in a floating point format (with separate representation of the mantissa and the fraction) or an integer format. The integer format is preferred in those cases in which the quantized data is subjected to further processing involving arithmetic and/or logic operations because on many computers such operations are faster if the operands are in integer format.

An exemplary quantization method is described in Gregory Ward Larson, "The LogLuv Encoding for Full Gamut, High Dynamic Range Images", Silicon Graphics, Inc. Mountain View, Calif. That method quantizes colors defined in either the CIE XYZ color coordinate system ("CCS") or its derivative system xyY. The colors are quantized into 32-bit values, and we will refer to this method as LogLuv32. The luminance component Y is quantized into the following value:

$$L_e = \lfloor 256(\log_2 Y + 64) \rfloor \quad (1)$$

The function $\lfloor \cdot \rfloor$ is the floor, i.e. $\lfloor x \rfloor$ is the largest integer not exceeding x. $L_e$ is coded as a 16-bit integer, with one bit for the sign and 15 bits for the magnitude. This logarithmic coding provides a constant or almost constant upper bound for the relative error $\Delta Y/Y$. The relative error is a good representation of the human ability to perceive luminance distortion. The upper bound for the relative error should be uniform (constant), and as large as possible, for effective reduction of the size of image data. According to the "LogLuv encoding" article cited above, the maximum error in quantization (1) is 0.27% (i.e. 0.0027) over the entire visible gamut.

For each color, the LogLuv32 method quantizes the color's chrominance coordinates x, y into a pair of 8-bit integer values $u_e$, $v_e$ as follows:

$$u_e = \lfloor 410 u' \rfloor$$

$$v_e = \lfloor 410 v' \rfloor \quad (2)$$

where $$u' = 4x/(-2x+12y+3)$$

$$v' = 9y/(-2x+12y+3) \quad (3)$$

Another quantization method for HDR images is described in Rafal Mantiuk, Karol Myszkowski, Hans-Peter Seidel, "Lossy Compression of High Dynamic Range Images and Video", Proceedings of SPIE, Volume 6057 (2006). This method quantizes the chromatic coordinates as in (2), and quantizes the physical luminance y into a 12-bit value l(y) as follows (the physical luminance y is not the same y as in the xyY system):

$$l(y) = \begin{cases} a \cdot y & \text{if } y < y_l \\ b \cdot y^c + d & \text{if } y_l \le y < y_h \\ e \cdot \log(y) & \text{if } y \ge y_h \end{cases} \quad (4)$$

Here a, b, c, e, $y_l$, $y_h$ are positive constants, d and f are negative constants. Choosing non-logarithmic quantization for lower values of the physical luminance y in (4) is based on studies of human visual perception as described in the "Lossy Compression" article.

SUMMARY

This section summarizes some features of the invention. Other features are described in the subsequent sections. The invention is defined by the appended claims, which are incorporated into this section by reference.

It is clear that human perception of color distortion depends not only on the luminance errors but also on the chrominance errors. The inventors use a new measure of color distortion which takes into account both luminance and chrominance errors. Some embodiments of the present invention provide quantization techniques developed by the inventors based on the new measure of color distortion. In some embodiments, a human user or some other entity can specify a desired upper bound for a relative quantization step, wherein the relative quantization step is a measure of the difference between adjacent colors in the reduced set of colors available for the quantized image. The relative quantization step is defined in terms of the new measure of the color distortion. The system provides a quantized image in which the maximum relative quantization step may at least approximately match the specified upper bound. Hence, a controlled trade-off is provided between the image distortion and the size of the image data. In some embodiments, the quantization methods cover the entire visible gamut.

The invention is not limited to the features and advantages described above. Other features are described below. The invention is defined by the appended claims, which are incorporated into this section by reference.

DESCRIPTION OF SOME EMBODIMENTS

Figure 1:
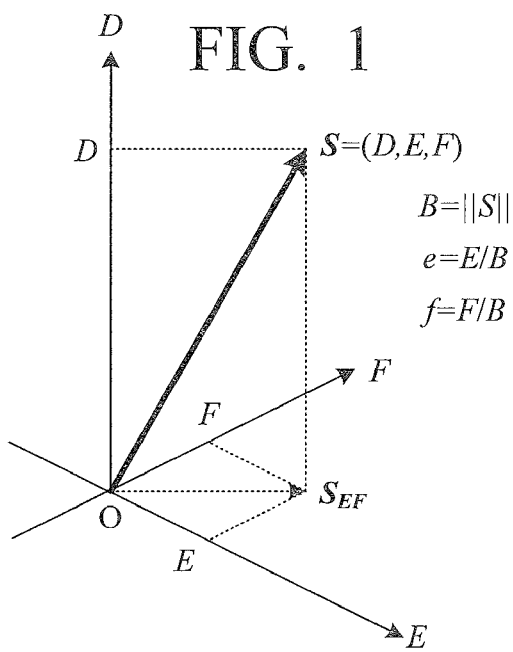
FIG. 1 is a geometric illustration of an orthonormal color coordinate system DEF2 and its derivative CCS Bef.

The embodiments described in this section illustrate but do not limit the invention. The invention is defined by the appended claims.

In order to characterize a quantization method both with respect to the luminance and with respect to the chrominance, the inventors use a metric in an orthonormal color coordinate system. Orthonormal CCS's are defined in U.S. patent application Ser. No. 11/494,393 filed Jul. 26, 2006 by S. Bezryadin (who is also one of the inventors herein), published as no. 2007/0154083 A1 on Jul. 5, 2007, incorporated herein by reference (now U.S. Pat. No. 7,639,396, issued Dec. 29, 2009). The orthonormal CCS's are also described Appendix A hereinbelow. In particular, some embodiments use the DEF2 CCS described in Appendix A (this CCS is denoted as DEF in the aforementioned patent application 2007/0154083; "2" in DEF2 denotes the 2° field of the underlying XYZ CCS). See also the inventors' presentations entitled "Local Criterion of Quality for Color Difference Formula" and "Color Coordinate System for Accurate Color Image Editing Software", incorporated herein by reference. Both presentations were made at the International Conference on Printing Technology held in St. Petersburg, Russia on Jun. 26-30, 2006 and are available at the web site of KWE International, Inc. of San Francisco, Calif. at the following respective addresses: http://www.kweii.com/site/color_theory/2006_SPb/lc/lc.pdf  http://www.kweii.com/site/color_theory/2006_SPb/ccs/ccs.pdf Suppose that a color S is replaced with a color S' in quantization. The colors available for a quantized image will be called Q-colors herein. Let $\Delta S=S'-S$ denote the difference between the original color S and the corresponding Q-color S'. The difference can be defined in terms of tristimulus values in a linear CCS. For example, in DEF2, if $S=(D,E,F)$ and $S'=(D',E,'F')$, then $\Delta S=(D'-D,E'-E,F'-F)$.

$\Delta S$ may alternatively be set to $S-S'$.

The color distortion measure used by the inventors is the ratio $$\delta S=\|\Delta S\|/\|S\| \tag{5}$$

where the operator $\|\cdot\|$ represents the Euclidian (Pythagorean) norm in DEF2:

$$\|S\|=\sqrt{D^2+E^2+F^2} \tag{6}$$

Using the measure (5), the inventors analyzed the indistinguishability data described in Wyszecki & Stiles, "Color Science; Concepts and Methods, Quantitative Data and Formulae" (2nd Ed. 2000), section 5.4 (pages 306-330; 793-803), incorporated herein by reference. For a color S, the corresponding indistinguishability region is the set of all colors indistinguishable from S to a human observer. As described in the Color Science reference, studies by Brown, MacAdam, Wiszecki and Fielder have indicated that in the CIE XYZ CCS, each indistinguishability region can be represented as an ellipsoid with a center at S. Since the DEF2 CCS is a linear transformation of the XYZ CCS, each indistinguishability region is an ellipsoid in DEF2.

For a number of such ellipsoids, the ellipsoids' geometry parameters in the XYZ CCS are specified in the Color Science reference, Table I(5.4.3), pages 801-803. Using these geometry parameters, the inventors calculated the lengths of the ellipsoids' shortest axes in DEF2. Let $a_{DEF}(S)$ denote the length of the shortest axis of the DEF2 ellipsoid centered at S. The value $a_{DEF}(S)$ is thus the diameter of the ball inscribed into the ellipsoid. Clearly, the inscribed ball consists of all colors S' such that $$\Delta S=\|S'-S\|\leq a_{DEF}(S)/2 \tag{7}$$

The inventors have discovered that for all the ellipsoids in Table I(5.4.3), $$a_{DEF}(S)/\|S\|\geq 0.01 \tag{8}$$

Therefore, if $$\delta S=\|S'-S\|/\|S\|\leq 0.005 \tag{9}$$

then S' lies within the ellipsoid centered at S, and hence S' and S are indistinguishable.

Figure 2:
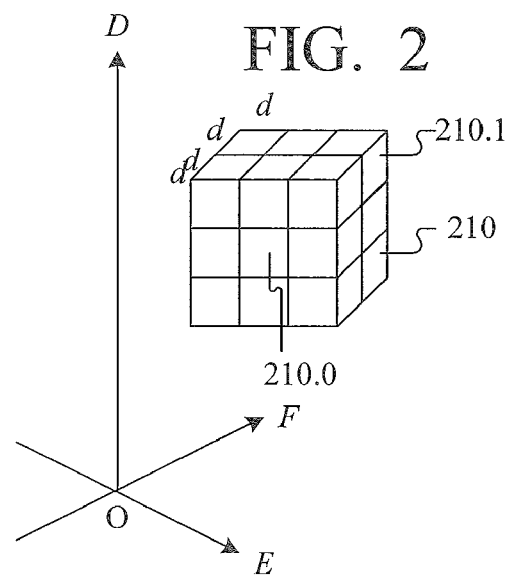
FIG. 2 is a geometric illustration of regions each of which is mapped into a single color when each DEF2 coordinate D, E, F is quantized separately.
Figure 3:
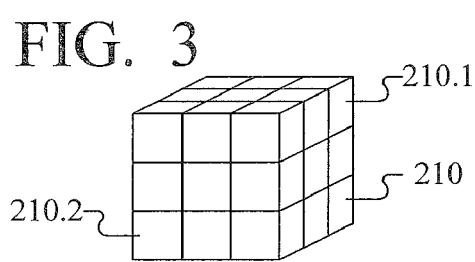
FIG. 3 is another geometric illustration of such regions.

Let us suppose that each DEF2 coordinate D, E, F is quantized linearly with a quantization step d. Then the color space can be partitioned into cubes 210 (FIG. 2) of side d. The colors in each cube 210 are mapped into the cube's center, i.e. are replaced with the cube's center in the quantized image. Each cube 210 will be called a Q-region herein. More generally, a Q-region is the set of all colors mapped into a single Q-color in quantization. Each cube 210 has 26 adjacent cubes. FIG. 2 shows some of the cubes adjacent to a cube 210.0. FIG. 2 does not show the nine cubes immediately in front of cube 210.0. FIG. 3 illustrates a block of the 27 cubes which includes the cube 210.0 at the center and also includes the 26 cubes adjacent to cube 210.0. In order to avoid generation of artifacts during quantization, the centers of all the 27 cubes should lie in a single ellipsoid. This condition is satisfied if the distance between the center of cube 210.0 and the center of any other one of the cubes does not exceed $a_{DEF}(S_0)/2$ where $S_0$ is the center of cube 210.0.

Clearly, the distance between the centers of cube 210.0 and an adjacent cube is the greatest for the eight cubes positioned diagonally with respect to cube 210.0, including cubes 210.1, 210.2. Each of the eight cubes shares only a vertex with cube 210.0. The distance between the centers of cube 210.0 and any one of the eight cubes is $d\cdot\sqrt{3}$. Therefore, the following is a sufficient condition for the centers of all the 27 cubes to lie in the ellipsoid centered at $S_0$:

$$d\cdot\sqrt{3}\leq a_{DEF}(S_0)/2 \tag{10}$$

If the coordinates D, E, F are quantized with respective different quantization steps, the condition (10) is sufficient for indistinguishability if d is the largest quantization step.

The inequality (8) provides a lower bound for $a_{DEF}(S_0)$ as $0.01\cdot\|S_0\|$, and hence (10) is satisfied if $d\cdot 2\sqrt{3}$ does not exceed that bound, or equivalently if $$d/\|S_0\|\leq 0.01/2\sqrt{3}\approx 0.003 \tag{11}$$

DEF2 does not provide luminance/chrominance separation. The Bef CCS described in Appendix A and FIG. 1 does provide luminance/chrominance separation. The quantization step d in the E and F coordinates (FIG. 2) corresponds to step d/B in the chromatic coordinates e=E/B, f=F/B. Let us denote the quantization steps in e and f as $d_e$ and $d_f$ respectively, and assume for simplicity that $d_e=d_f$. Denoting this common value as $d_{ef}$, we obtain from (11):

$$d_{ef}=d/\|S_0\| \leq 0.01/2\sqrt{3} \approx 0.003 \quad (12)$$

The estimate (12) provides heuristic guidance in the choice of $d_{ef}$, but this estimate was obtained based on the (11) computation for DEF2, not Bef, i.e. for separate quantization of the D coordinate, not the B coordinate. In particular, the Q-regions in Bef are not cubes. The DEF2 analysis will now be carried over to Bef to derive estimates for the Bef quantization steps $d_e$, $d_f$ and $\delta B=|B'-B|/|B|$ (the relative step for the brightness).

In FIG. 2, suppose $S_0$ (the center of cube 210.0) has DEF2 coordinates $(D_0, E_0, F_0)$. Then the set of the 27 Q-colors at the centers of the 27 Q-regions 210 can be described as $(D_0, E_0, F_0)$, $(D_0 \pm d, E_0, F_0)$, $(D_0, E_0 \pm d, F_0)$, etc. This set is thus the set of all colors (D,E,F) such that:

D can be any one of $D_0$, $D_0+d$, $D_0-d$;
E can be any one of $E_0$, $E_0+d$, $E_0-d$; and
F can be any one of $F_0$, $F_0+d$, $F_0-d$.

In other words, the centers of the 27 Q-regions 210 are the following set:

$$\{(D,E,F): D \in \{D_0, D_0+d, D_0-d\};$$

$$E \in \{E_0, E_0+d, E_0-d\};$$

$$F \in \{F_0, F_0+d, F_0-d\}\} \quad (13)$$

Each cube can be defined as the set of all the colors (D,E,F) such that each coordinate D, E, F is in some interval. For example, cube 210.0 is the following set:

$$\{(D,E,F): D \in (D_0-d/2, D_0+d/2);$$

$$E \in (E_0-d/2, E_0+d/2);$$

$$F \in (F_0-d/2, F_0+d/2)\} \quad (14)$$

Each interval may or may not include its end points, and will typically include one of the end points; for example, $(D_0-d/2, D_0+d/2)$ can be replaced with $(D_0-d/2, D_0+d/2]$. Each end point, e.g.

$$D=D_0 d/2 \quad (15)$$

defines a plane containing the cube's edge.

Similar analysis will now be performed for Bef. Each coordinate B, e, f can be quantized separately. The B coordinate can be quantized into one of values $\{B_i\}$ where i is some index. Similarly, each of the e and f coordinates can be quantized respectively into one of values $\{e_j\}$ or $\{f_k\}$ where j and k are indices. Thus, the Q-colors are the colors $(B_i, e_j, f_k)$. The indices i, j, k can be in any set. We will assume for the sake of illustration that i, j, k are integers, and that increasing indices correspond to increasing coordinates, i.e.

$$\ldots B_{i-1} < B_i < B_{i+1} < \ldots$$

$$\ldots e_{j-1} < e_j < e_{j+1} < \ldots$$

$$\ldots f_{k-1} < f_k < f_{k+1} < \ldots$$

By analogy with (14), for each Q-color $(B_i, e_j, f_k)$, the corresponding Q-region is the set of all the colors (B,e,f) such that each of B, e, f is in some interval containing the respective value $B_i$, $e_j$, or $f_k$ (such interval is called a neighborhood of $B_i$, $e_j$, or $f_k$). By analogy with (15), the Q-region's boundaries are surfaces defined by one of the coordinates being a constant equal to an end point of the corresponding interval, i.e. B=const., e=const. or f=const.

Figure 4:
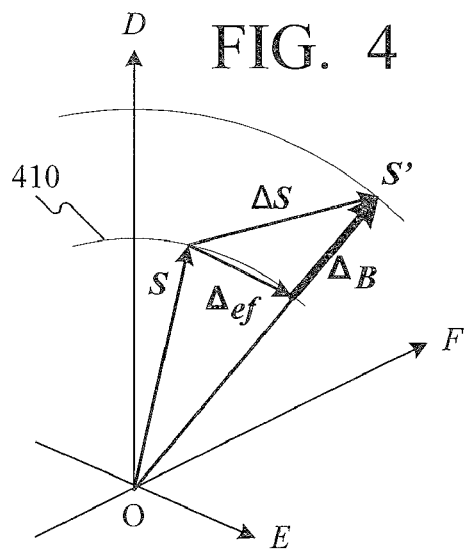
FIG. 4 is a geometric illustration of estimating a relative quantization step in Bef.

For any constant $\alpha>0$, the equation $B=\alpha$ defines a sphere 410 (FIG. 4) of radius a and the center at the origin O of the DEF2 coordinate system. Therefore, a neighborhood of $B_i$ corresponds to a spherical shell including the sphere $B=B_i$. The equation $e=\alpha$ defines a circular conical surface about the E axis with the vertex at the origin O. Therefore, a neighborhood of $e_j$ corresponds to a conical shell. Similarly a neighborhood of $f_k$ corresponds to a conical shell about the F axis. The Q-region for the point $(B_i, e_j, f_k)$ is therefore the intersection of the spherical shell for $B_i$ with the conical shells for $e_j$ and $f_k$ and with the visible spectrum. The visible spectrum is a region contained in a non-circular cone centered at the origin O and extending upwards $(D \geq 0)$ about the D-axis.

By analogy with FIG. 2, each Q-region in Bef has 26 adjacent Q-regions, with their 26 Q-colors (except that there are fewer than 26 adjacent regions at the visible spectrum's boundary.) By analogy with (13), each Q-color $(B_i, e_j, f_k)$ and its 26 adjacent Q-colors (in the adjacent Q-regions) form the following set:

$$\{(B,e,f): B \in \{B_{i-1}, B_i, B_{i+1}\};$$

$$e \in \{e_{j-1}, e_j, e_{j+1}\};$$

$$f \in \{f_{j-1}, f_j, f_{j+1}\}\} \quad (16)$$

All the 27 Q-colors should lie in a single ellipsoid. This condition is satisfied (see (9)) if, for all colors S' in the set (16):

$$\delta S=\|S'-S_0\|/\|S_0\| \leq 0.005 \quad (17)$$

where $S_0=(B_i, e_j, f_k)$. The condition (17) should be satisfied for any Q-color $S_0$, and hence for the maximum $\delta S$ value, which will be denoted $\delta_{Smax}$.

We will now express $\delta_{Smax}$ in terms of the quantization steps $\delta_B$, $d_e$, $d_f$ (we use the symbols $\delta B$ and $\delta_B$ interchangeably). Given a Q-color S=(B,e,f) and an adjacent Q-color S'=(B+dB, e+de, f+df), the vector $\Delta S=S'-S$ can be represented as the sum of two vectors (FIG. 4):

$$\Delta S=\Delta_{ef}+\Delta_B \quad (18)$$

Here $\Delta_{ef}$ is obtained by changing e, f while keeping B constant, and $\Delta_B$ is obtained by changing B while keeping e, f constant:

$$\Delta_{ef}=(B, e+de, f+df)-(B,e,f)$$

$$\Delta_B=(B+dB, e+de, f+df)-(B, e+de, f+df)$$

Since the angle between S and S' is small, $\Delta_{ef}$ and $\Delta_B$ are approximately mutually orthogonal in DEF2 because $\Delta_{ef}$ is directed approximately along the spherical surface (B=constant) and $\Delta_B$ perpendicularly to the spherical surface, radially from the origin. Therefore:

$$\|\Delta S\|^2 \approx \|\Delta_{ef}\|^2 + \|\Delta_B\|^2$$

Since $\|S\|=|B|$ and $\|\Delta_B\|=|\Delta B|$, we can write (after dividing through by $\|S\|^2$):

$$\delta S \approx (\|\Delta_{ef}\|^2/B^2 + \delta B^2)^{1/2} \quad (19)$$

Based on their analysis of experimental data on human visual perception as described in Appendix B hereinbelow, the inventors have obtained the following approximate bound for $\|\Delta_{ef}\|/B$:

$$\|\Delta_{ef}\|/B \leq 3 \cdot \max(de, df) \quad (20)$$

This bound and (19) provide:

$$\delta_{Smax} \approx ([3\cdot\max(d_e,d_f)]^2+\delta B^2)^{1/2} \quad (21)$$

Denoting $$\delta_{ef}=3\cdot\max(d_e,d_f) \quad (22)$$

we can write:

$$\delta_{Smax} \approx (\delta_{ef}^2+\delta B^2)^{1/2} \quad (23)$$

The condition (9) therefore leads to the following desirable condition:

$$(\delta_{ef}^2+\delta B^2)^{1/2} \leq 0.005 \quad (24)$$

In some embodiments, the B coordinate is quantized using a combination of linear and logarithmic coding, as described in U.S. patent application Ser. No. 11/564,730 filed on 29 Nov. 2006 by S. Bezryadin (also named as inventor in the present application) and incorporated herein by reference. The e and f coordinates are quantized linearly. More particularly, the values (B,e,q) are coded as $B_Q$, $e_Q$, $f_Q$ as follows:

$$B_S=k_1\cdot B/B_L \text{ if } B\leq B_L \quad (25A\text{-}1)$$

$$B_S=k_2\cdot(1+\ln(B/B_L)) \text{ if } B>B_L \quad (25A\text{-}2)$$

$$e_S=k_e\cdot e \quad (25B)$$

$$f_S=k_f\cdot f \quad (25C)$$

$$B_Q=\text{Round}(B_S) \quad (26A)$$

$$e_Q=\text{Round}(e_S) \quad (26B)$$

$$f_Q=\text{Round}(f_S) \quad (26C)$$

where $k_1$, $k_2$, $k_e$, $k_f$ and $B_L$ are suitable constants. The function Round(•) represents rounding to the nearest integer. The half-integers can be rounded according to any suitable convention. For example, in some embodiments the half-integers are rounded up if they are positive, down if they are negative:

$$\text{Round}(x)=\lfloor x+\tfrac{1}{2}\rfloor \text{ if } x\geq 0 \quad (27)$$

$$\text{Round}(x)=\lceil x-\tfrac{1}{2}\rceil \text{ if } x<0.$$

⌈•⌉ is the ceiling function, i.e. ⌈x⌉ is the smallest integer greater than or equal to x. Other rounding techniques are also possible.

In some embodiments, $B_S$ is a continuous function of B at $B=B_L$, and therefore (25A-1) and (25A-2) imply that $k_1=k_2$. We will denote this common value as $k_B$. Thus:

$$B_S=k_B\cdot B/B_L \text{ if } B\leq B_L, \quad (28A)$$

$$B_S=k_B\cdot(1-\ln(B/B_L)) \text{ if } B>B_L \quad (28B)$$

For small brightness values (such as $B<B_L$), a suitable measure of human perception of brightness distortion is the absolute error $\Delta B$ rather than the relative error $\delta B$. The absolute error $\Delta B$ is a better measure if the image is so dark as to be viewed without physical adaptation of the eye (e.g. iris constriction). The value $B_L$ is therefore chosen suitably low in some cases, e.g. 1 cd/m². See the aforementioned U.S. patent application Ser. No. 11/564,730. The absolute error $$\Delta B=B_L/k_B \quad (29)$$

can be low if $B_L$ is low and $k_B$ is high.

In some embodiments, $k_e=k_f$, and we will denote this value as $k_{ef}$.

The inverse transformation converts an integer triple ($B_Q$, $e_Q$, $f_Q$) into a Q-color ($B_i$, $e_j$, $f_k$) as follows:

$$B_i=B_Q\cdot B_L/k_B \text{ if } B_Q\leq k_B \quad (30A\text{-}1)$$

$$B_i=B_L\cdot e^{B_Q/k_B-1} \text{ if } B_Q>k_B \quad (30A\text{-}2)$$

$$e_j=e_Q/k_e \quad (30C)$$

$$f_k=f_Q/k_f \quad (30D)$$

We will now describe the set $Q_e$ of possible values $e_j$, the set $Q_k$ of possible values $f_k$, and the set $Q_B$ of possible values $B_i$. The e coordinate can take any value from −1 to 1 inclusive. Therefore, $e_Q$ can be any integer in the range of Round($-k_e$) to Round($k_e$). Assuming that $k_e$ is integer, the set $Q_e$ consists of the following values (see (30C)):

$$\{-1,-(k_e-1)/k_e,-(k_e-2)/k_e,\ldots,0,\ldots,(k_e-1)/k_e,1\} \quad (31)$$

Therefore, $$d_e=1/k_e \quad (32)$$

The set $Q_e$ has ($2k_e+1$) possible values, which is the number of possible values of the coded coordinate $e_Q$. Therefore, ⌈$\log_2(2k_e+1)$⌉ bits are needed if a separate field is used to represent $e_Q$ in the quantized image. In some embodiments, −1 or 1 or both are omitted from $Q_e$, and so ⌈$\log_2(2k_e)$⌉ bits are sufficient. In this case, the value $k_e$ can be chosen as a power of 2 in order not to waste the bits in the $e_Q$ representation. Choosing $k_e$ as a power of 2 may also improve the computation speed (see (25B) for example).

Similarly, the set $Q_f$ consists of the following values:

$$\{-1,-(k_f-1)/k_f,-(k_f-2)/k_f,\ldots,0,\ldots,(k_f-1)/k_f,1\} \quad (33)$$

Therefore, $$d_f=1/k_f \quad (34)$$

The set $Q_f$ has ($2k_f+1$) possible values, which is the number of possible values of the coded coordinate $f_Q$. Therefore, ⌈$\log_2(2k_f+1)$⌉ bits are needed if a separate field is used to represent $f_Q$. In some embodiments, −1 or 1 or both are omitted from $Q_f$, and so ⌈$\log_2(2k_f)$⌉ bits are sufficient. The value $k_f$ can be chosen then as a power of 2.

It follows from (22) that $$\delta_{ef}=3\cdot\max(1/k_e,1/k_f) \quad (35)$$

The set $Q_B$ of the $B_i$ values consists of:
1. Linear range values:

$$\{0,B_L/k_B,2B_L/k_B,\ldots,B_L\} \quad (36A)$$

2. Logarithmic range values:

$$\{B_L\cdot e^{(k_B+1/k_B-1)},B_L\cdot e^{(k_B+2)/k_B-1}\} \quad (36B)$$

where $B_{Qmax}$ is the maximum value of $B_Q$. This set has ($B_{Qmax}+1$) possible values, so ⌈$\log_2(B_{Qmax}+1)$⌉ bits are needed if a separate field is used to represent $B_{Qmax}$.

In the logarithmic range, the relative brightness error $\delta B$ is $$\delta B = [(B_L\cdot e^{(n+1)/k_B-1})-(B_L\cdot e^{n/k_B-1})]/B_L\cdot e^{n/k_B-1} \quad (37)$$

$$= e^{1/k_B}-1$$

In the linear range, $$\Delta B=B_L/k_B \quad (38)$$

For the logarithmic range, the bound $\delta_{Smax}$ can be obtained from (35) and (37). The logarithmic range is believed to be the most important for many images.

The dynamic range $DR_{log}$ in the logarithmic range is $$DR_{log} = e^{B_{Qmax}/k_B} - 1 \qquad (39)$$

(assuming the minimum brightness value of $B_L$). The total dynamic range DR is:

$$DR = k_B \cdot e^{B_{Qmax}/k_B} - 1 \qquad (40)$$

Let us consider an example. Suppose the user wants to quantize each color into a 32-bit value, i.e. $B_Q$, $e_Q$, $f_Q$ must fit into 32 bits. If we want $d_e$, $d_f$ to satisfy (12), then each of $k_e$, $k_f$ has to be at least $1/0.003 = 334$ (see (32), (34)). The number of bits needed to represent each of $e_Q$, $f_Q$ is therefore $\lceil \log_2(2\cdot334+1) \rceil = 10$. Hence, we can increase $k_e$, $k_f$ to 512, and thus decrease $d_e$ and $d_f$ (and hence $\delta_{Smax}$), without increasing the data size. In this case (see (22)):

$$\delta_{ef} = 3/512 \approx 0.006$$

If 10 bits are allocated for each of $e_Q$, $f_Q$, then 12 bits are left for $B_Q$. Therefore, $\lceil \log_2(B_{Qmax}+1) \rceil = 12$, and hence $B_{Qmax} = 4095$.

Preferably, $\delta B$ should not exceed 0.005. See (24) and the aforementioned U.S. patent application Ser. No. 11/564,730. From (37) we obtain:

$$e^{1/k_B} - 1 \leq 0.005$$

so $$k_B \geq 201$$

In some embodiments, $k_B = 256$. Then $\delta B \approx 0.4$, and $\delta_{Smax}$ is slightly above 0.007. In some embodiments, $B_L = 1$ cd/m$^2$.

The total dynamic range is over $8 \cdot 10^8$, and the dynamic range in the logarithmic range is over $3 \cdot 10^6$ (see (39) and (40)).

The dynamic range of the visible spectrum is about $10^{15}$ (when measured as the ratio of the physical luminance of the sun's surface to the physical luminance of the moonless sky at night). See Mantiouk's article cited above. The dynamic range of the Bef coding can be increased while keeping the color distortion small by increasing the size of the quantized data ($B_Q$, $e_Q$, $f_Q$) beyond 32 bits. The relative error $\delta S$ can be reduced if the quantized data size is increased.

Some embodiments allow the user to designate a desired upper bound $\delta_{Smax}$ for the relative error $\delta S$. Larger $\delta_{Smax}$ values provide smaller size of quantized data. For example, if the initial image is noisy, e.g. obtained by a noisy camera, then specifying $\delta_{Smax} = 0.005$ may serve to preserve the noise, leading to a waste of storage for the quantized data. Therefore, a larger $\delta_{Smax}$ value may be appropriate. The invention is not limited to particular reasons for selecting a particular $\delta_{Smax}$ value, and values both above and below 0.005 can be used. Of note, values smaller than required for visual indistinguishability may be appropriate if additional errors can be introduced after quantization (e.g. during image editing or display).

When the user specifies $\delta_{Smax}$, the computer system quantizes the image so as to meet the $\delta_{Smax}$ bound at least approximately. For that purpose, the computer system automatically selects the number of bits for each of $B_Q$, $e_Q$, $f_Q$ and performs quantization.

Figure 5:
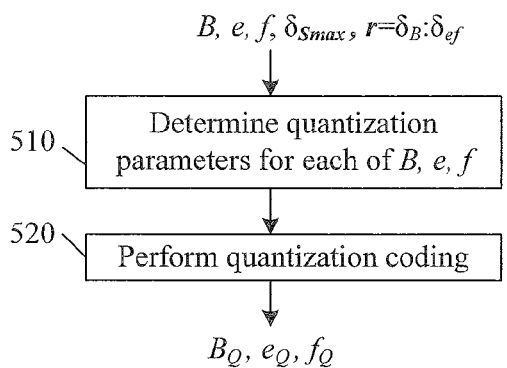
FIG. 5 is a flowchart of a quantization operation according to some embodiments of the present invention.

One quantization embodiment is shown in FIG. 5. At step 510 (FIG. 5), the computer system obtains the image data that need to be quantized. The image data may be in Bef, or may be converted to Bef by the computer system. The computer system also receives the $\delta_{Smax}$ parameter from the user or some other source (e.g. from a computer program).

Figure 6:
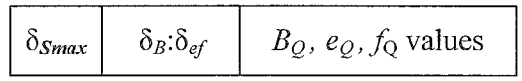
FIG. 6 illustrates a format for a quantized digital image according to some embodiments of the present invention.

At step 510, the computer system determines quantization parameters (e.g. $k_B$, $k_e$, etc.) for each of B, e, f as described in more detail below. At step 520, the computer system performs quantization and outputs the quantized data $B_Q$, $e_Q$, $f_Q$. The quantized data can be stored in a file, together with the $\delta_{Smax}$ parameter if desired, as illustrated in FIG. 6.

The quantization parameters can be obtained using the relationship (23) and a predefined ratio $r = \delta_B : \delta_{ef}$. The r value can be defined by the user, the system designer, or by some other entity. If $\delta_B$ is reduced (i.e. if r is reduced), the brightness distortion will be reduced at the expense of the chromatic distortion, and vice versa. At step 510, the computer computes $\delta_B$ and $\delta_{ef}$:

$$\delta_{ef} = \delta_{Smax}/\sqrt{r^2+1}$$

$$\delta_B = \delta_{Smax} \cdot r/\sqrt{r^2+1}$$

("sqrt" denotes square root).

The parameters $k_e$, $k_f$, $k_B$ can be obtained, for example, as follows. If $k_e = k_f$, then (35) provides that $$k_{ef} = 3/\delta_{ef} \qquad (41)$$

Due to (37), we can set $$k_B = 1/\ln(1+\delta_B) \qquad (42)$$

The $k_B$ computation can be simplified by setting:

$$k_B = 1/\delta_B \qquad (43)$$

because $\ln(1+\delta_B) \approx 1/\delta_B$ for small $\delta_B$.

Example: suppose $r=1$. Then $$\delta_{ef} = \delta_B = \delta/\sqrt{2} \approx \delta_{Smax}/1.4;$$

$$k_B = 1.4/\delta_{Smax};$$

$$k_{ef} = 3 \cdot \sqrt{2}/\delta_{Smax} \approx 4.2/\delta_{Smax}.$$

If $\delta_{Smax} = 0.005$, then $k_B = 283$, and $k_{ef} = 849$. The value $k_{ef}$ can be rounded up to 1024 (10 bits for each of e and f). The invention is not limited to particular computations however.

Figure 7:
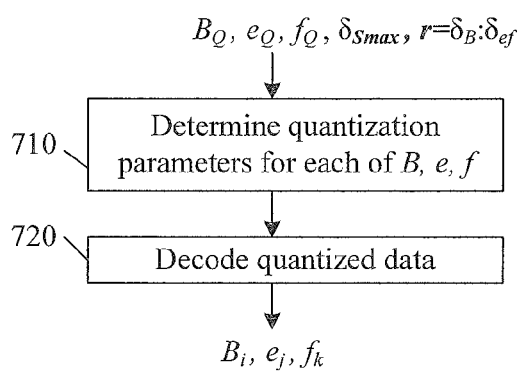
FIG. 7 is a flowchart of decoding quantized data to obtain color coordinates of a quantized image according to some embodiments of the present invention.

FIG. 7 shows decoding of the quantized data to generate the quantized image (i.e. the Q-colors) such as may be performed to display the image encoded as in FIG. 6. At step 710, a computer system obtains the coded data $B_Q$, $e_Q$, $f_Q$ and quantization parameters such as $k_{ef}$, $k_B$ for example. The quantization parameters can be provided to the computer system with the coded data, or can be computed by the computer system from other parameters such as, for example, $\delta_{Smax}$ and r. At step 720, the computer system computes the image colors ($B_i$, $e_j$, $f_k$).

Figure 8:
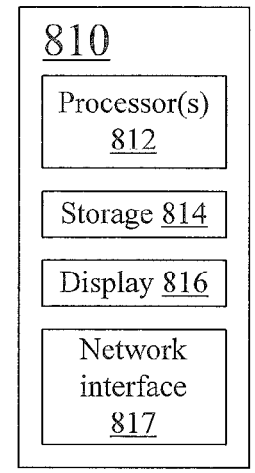
FIG. 8 is a block diagram of a computer system suitable for performing quantization coding and/or decoding according to some embodiments of the present invention.

FIG. 8 illustrates a computer system 810 suitable for either the quantization operation of FIG. 5 or the decoding of FIG. 7. The computer system may include one or more computer processors 812 which execute computer instructions, and may also include computer storage 814 (including possibly magnetic, optical, semiconductor, and/or other types of storage, known or to be invented). If data display is desired, the system may include one or more display devices 816 (e.g. monitors, printers, or some other type, known or to be invented). If a network connection is desired, network interface 817 can be provided. Image data and computer programs manipulating the data (such as programs that perform the methods described herein) can be stored in storage 814 and/or read over a network.

The invention is not limited to the embodiments described above. For example, at step 510, $\delta_{ef}$ could be estimated as $4 \cdot \max(d_e, d_f)$ for (23), or using some other multiplier k in $$\delta_{ef} = k \cdot \max(d_e, d_f).$$

Also, $\delta_{Smax}$ could be estimated as $$\delta_{Smax} = \operatorname{sqrt}(c_1 \cdot [\max(d_e, d_f)]^2 + c_2 \cdot \delta B^2) \quad (44)$$

where $c_1$, $c_2$ are any positive constants. Thus, in some embodiments, the computer system receives values $\delta_{Smax}$ and r and at step 510.2 computes the values $d = \max(d_e, d_f)$ and $\delta B$ to satisfy (44). Then the computer system sets:

$$k_{ef} = 1/\max(d_e, d_f)$$

and computes $k_B$ as in (42) or (43). Other expressions for $\delta_{Smax}$ are possible, such that the chromatic steps (e.g. $d_e$, $d_f$) and the relative brightness step $\delta B$ could be increasing functions of $\delta_{Smax}$ which are strictly increasing for at least some values of $\delta_{Smax}$. One example is:

$$\delta_{Smax} = c_1 \cdot \max(d_e, d_f) + c_2 \cdot \delta B$$

Also, $d_e$ and $d_f$ do not necessarily coincide. For example, any of the following expressions can be used:

$$\delta_{Smax} = c_e \cdot d_e + c_f \cdot d_f + c_2 \cdot \delta B \quad (45)$$

$$\delta_{Smax} = \operatorname{sqrt}(c_e \cdot d_e^2 + c_f \cdot d_f^2 + c_2 \cdot \delta B^2) \quad (46)$$

where $c_e$, $c_f$ are positive constants. Additional information can be provided instead of r to determine $d_e$, $d_f$ and $\delta B$ from $\delta_{Smax}$. An example of such information is the double ratio $d_e : d_f : \delta B$. Then $k_e$, $k_f$ can be determined at step 510.2 as in (32), (34), and kg can be determined as in (42) or (43). The double ratio can be provided with the quantized data (as in FIG. 6) together with $\delta_{Smax}$.

The invention is not limited to particular theories such as the particular study of ellipsoids and error estimates explained above or in the appendices below. These studies are incomplete because they do not cover the ellipsoids of all the possible colors and involve other simplifications such as approximate computations, simplified models of human visual perception, and possibly others. The invention is directed to particular quantization techniques as recited in the claims, and not to any theories leading to these techniques.

In some embodiments, different computations can be combined in a single computation, omitting the computation of intermediate values (such as the values $B_S$, $e_S$, $f_S$). Also, multiplication by $k_B$ can be omitted, and the values $B_S$ or $B_Q$ can be computed simply by taking the most significant bits in the fixed-point representation of these values. Of note, the term "integer format" as used herein includes fixed-point format. The invention is not limited to integer format. Color coordinate systems other than Bef can be used.

Some embodiments include a computer-implemented method for quantizing a first digital image, the method comprising: obtaining a first parameter representing a desired upper bound $\delta_{Smax}$ for relative quantization steps to be used in quantizing any color in at least a first range of colors. The first range of colors may be, for example, the set of all visible colors with $B > B_L$, where $B_L$ is a predefined value, e.g. 1 cd/m². Alternatively, the first range may be the entire visible range. Other ranges are also possible. A relative quantization step for a color is defined as follows. If S', S" are adjacent Q-colors, then the relative quantization steps $\delta S'$, $\delta S''$ are:

$$\delta S' = \|S' - S''\| / \|S'\|$$

$$\delta S'' = \|S' - S''\| / \|S''\|$$

where for any color S, $\|S\|$ is the square root of the sum of squares of tristimulus values of the color S in a predefined 70%-orthonormal linear color coordinate system ("linear CCS"), for example, in DEF2.

The definition of a relative quantization step involves the concept of "adjacent" Q-colors. Q-colors S', S" are called adjacent if one or both of the following conditions (A), (B) hold true:
 (A) S', S" correspond to adjacent Q-regions, i.e. the Q-regions that map into S' and S" are adjacent to each other;
 (B) Suppose that quantization involves separately quantizing each color coordinate in some CCS (e.g. in Bef). Let us denote the CCS coordinates as $\alpha$, $\beta$, $\gamma$ (for example, $\alpha = B$, $\beta = e$, $\gamma = f$). For the Q-colors, denote the set of all possible $\alpha$ values as $Q_\alpha$; the set of all possible $\beta$ values as $Q_\beta$; and the set of all possible $\gamma$ values as $Q_\gamma$. Then $S' = (\alpha', \beta', \gamma')$ and $S'' = (\alpha'', \beta'', \gamma'')$ are called adjacent if each of the following conditions (i), (ii), (iii) is true:
 (i) $\alpha'$ and $\alpha''$ coincide or are adjacent in $Q_\alpha$;
 (ii) $\beta'$ and $\beta''$ coincide or are adjacent in $Q_\beta$; and
 (iii) $\gamma'$ and $\gamma''$ coincide or are adjacent in $Q_\gamma$.

For example, the colors $(B_i, e_j, f_k)$ and $(B_{i+1}, e_{j-1}, f_k)$ are adjacent.

The method further comprises generating a quantized digital image using the first parameter. For example, generation of the quantized digital image may involve defining the sets $Q_\alpha$, $Q_\beta$, $Q_\gamma$ using the value $\delta_{Smax}$. See e.g. (31), (33), (36A), (36B). The sets $Q_\alpha$, $Q_\beta$, $Q_\gamma$ define the set of colors available for quantization and hence define the quantization steps in each coordinate. Alternatively, the sets $Q_\alpha$, $Q_\beta$, $Q_\gamma$ may be defined incompletely. For example, the value $B_{Qmax}$ may be undefined.

In some embodiments, the first digital image is represented by data which represent each color of the first digital image using a non-linear color coordinate system ("non-linear CCS"). One suitable example of the non-linear CCS is Bef. The non-linear CCS includes a brightness coordinate (e.g. B) representing the square root of the sum of squares of the tristimulus values of the linear CCS. For example, the brightness coordinate can be $B = \operatorname{sqrt}(D^2 + E^2 + F^2)$. Alternatively, the brightness coordinate can be $-B$, or $2B$, or some other representation of $\operatorname{sqrt}(D^2 + E^2 + F^2)$. The non-linear CCS also comprises one or more chromatic coordinates (e.g. e, f) whose values are unchanged if the tristimulus values are multiplied by a positive number (for example, the e, f coordinates of a color S with tristimulus values (D,E,F) are the same as of a color kS with tristimulus values (kD, kE, kF) where k is a positive number).

In some embodiments, generating the quantized digital image comprises quantizing the brightness coordinate using the first parameter and also quantizing said one or more chromatic coordinates using the first parameter.

In some embodiments, the computer system uses the first parameter to generate (i) a brightness parameter (e.g. $\delta B$) specifying a desired maximum bound for relative quantization steps $\delta B$ for the brightness coordinate in at least a range of values of the brightness coordinate (e.g. at least in the logarithmic range), and (ii) one or more chromatic parameters (e.g. $\delta_{ef}$) specifying one or more desired maximum bounds for quantization steps d for the one or more chromatic coordinates in at least one or more ranges of values of the chromatic coordinates (e.g. in the entire ranges $-1 \leq e \leq 1$, $-1 \leq f \leq 1$). The brightness coordinate is then quantized using the brightness parameter, and said one or more chromatic coordinates are quantized using the one or more chromatic parameters.

In some embodiments, the brightness parameter and the one or more chromatic parameters are determined from the first parameter to satisfy the equation:

$$\delta_{Smax}^2 = c_1 \cdot d^2 + c_2 |\delta B|^2$$

where d is a quantization step used in each of the one or more chromatic coordinates, and $c_1$, $c_2$ are predefined constants independent of the first parameter. For example, in (21) and (23), $c_1=9$ and $c_2=1$.

In some embodiments, generating the quantized digital image comprises quantizing the brightness coordinate, wherein in at least a range of values of the brightness coordinate (e.g. the range $B>B_L$), the quantizing of the brightness coordinate comprises logarithmic quantizing in which a quantized brightness coordinate (e.g. $B_S$ or $B_Q$) is a predefined first rounded or unrounded linear function of a logarithm to a predefined base (e.g. the natural base e; changing the base corresponds to multiplication by a positive constant) of a predefined second rounded or unrounded linear function of the brightness (e.g. the function $B/B_L$), the first and/or second linear functions and/or the base being dependent on the first parameter. For example, in the case (28B) the first linear function can be $$f_1(x) = k_B \cdot (1+x)$$

or $$f_1(x) = \text{Round}(k_B \cdot (1+x))$$

The second linear function can be $$f_2(B) = B/B_L$$

or $$f_2(B) = \text{Round}(B/B_L)$$

In this case, the value $k_B$, and hence the function $f_1$, are dependent on the first parameter (on $\delta_{Smax}$)·$f_2$ is independent of the first parameter.

Some embodiments include computer systems programmed to perform the quantization methods according to embodiments of the present invention. Some embodiments include computer-readable manufactures (e.g. computer disks, tapes, and other types of memories) comprising computer-readable programs for performing the quantization methods of embodiments of the present invention. The present invention also covers network transmission methods for transmitting such computer programs (e.g. to upload or download the programs into a computer system).

Other embodiments and variations are within the scope of the invention, as defined by the appended claims.

APPENDIX A

Orthonormal Color Coordinate Systems

Let $\bar{d}(\lambda)$, $\bar{e}(\lambda)$, $\bar{f}(\lambda)$ be color matching functions of some linear color coordinate system (CCS). The CCS is called orthonormal if its color matching functions $\bar{d}(\lambda)$, $\bar{e}(\lambda)$, $\bar{f}(\lambda)$ form an orthonormal system in the function space $L_2$ on $[0,\infty)$ (or on any interval containing the visible range of the $\lambda$ values if the color matching functions are zero outside of this range), that is:

$$\int_0^\infty \bar{d}(\lambda)\bar{e}(\lambda)d\lambda = \int_0^\infty \bar{d}(\lambda)\bar{f}(\lambda)d\lambda = \int_0^\infty \bar{e}(\lambda)\bar{f}(\lambda)d\lambda = 0$$

$$\int_0^\infty [\bar{d}(\lambda)]^2 d\lambda = \int_0^\infty [\bar{e}(\lambda)]^2 d\lambda = \int_0^\infty [\bar{f}(\lambda)]^2 d\lambda = K \quad (A1)$$

where K is a positive constant defined by the measurement units for the wavelength $\lambda$, and the radiance $P(\lambda)$. The units can be chosen so that K=1.

The integrals in (A1) can be replaced with sums if the color matching functions (CMF's) are defined at discrete $\lambda$ values, i.e.:

$$\sum_\lambda \bar{d}(\lambda)\bar{e}(\lambda) = \sum_\lambda \bar{d}(\lambda)\bar{f}(\lambda) = \sum_\lambda \bar{e}(\lambda)\bar{f}(\lambda) = 0 \quad (A2)$$

$$\sum_\lambda [\bar{d}(\lambda)]^2 = \sum_\lambda [\bar{e}(\lambda)]^2 = \sum_\lambda [\bar{f}(\lambda)]^2 = K$$

where the sums are taken over a discrete set of the $\lambda$ values. The constant K can be different than in (A1). Color matching functions will be called orthonormal herein if the satisfy the equations (A1) or (A2).

Color coordinate systems DEF2, BEF, and Bef which can be defined, for example, as follows. DEF2 is a linear CCS defined as a linear transformation of the 1931 CIE XYZ color coordinate system for the 2° field. DEF2 coordinates D, E, F are:

$$\begin{bmatrix} D \\ E \\ F \end{bmatrix} = A_{XYZ-DEF} \begin{bmatrix} X \\ Y \\ Z \end{bmatrix} \quad (A3)$$

where:

$$A_{XYZ-DEF} = \begin{bmatrix} 0.205306 & 0.712507 & 0.467031 \\ 1.853667 & -1.279659 & -0.442859 \\ -0.365451 & 1.011998 & -0.610425 \end{bmatrix} \quad (A4)$$

It has been found that for many computations, adequate results are achieved if the elements of matrix $A_{XYZ-DEF}$ are rounded to four digits or fewer after the decimal point, i.e. the matrix elements can be computed with an error Err≦0.00005. Larger errors can also be tolerated in some embodiments.

When $D>0$ and $E=F=0$, the color is white or a shade of gray. Such colors coincide, up to a constant multiple, with the CIE $D_{65}$ white color standard.

If a color is produced by monochromatic radiation with $\lambda=700$ nm (this is a red color), then F=0 and E>0.

If $S_1$ and $S_2$ are two colors with DEF2 coordinates (D1, E1, F1) and (D2, E2, F2), a dot product of these colors can be defined as follows:

$$<S_1, S_2> = D1*D2 + E1*E2 + F1*F2 \quad (A5)$$

Thus, the DEF2 coordinate system can be thought of as a Cartesian coordinate system having mutually orthogonal axes D, E, F (FIG. 1), with the same measurement unit for each of these axes.

The dot product (A5) does not depend on the CCS as long as the CCS is orthonormal in the sense of equations (A1) or (A2) and its CMF's are linear combinations of $\bar{d}(\lambda)$, $\bar{e}(\lambda)$, $\bar{f}(\lambda)$. More particularly, let $T_1$, $T_2$, $T_3$ be tristimulus values in a color coordinate system whose CMF's $\bar{t}_1$, $\bar{t}_2$, $\bar{t}_3$ belong to a linear span Span($\bar{d}(\lambda)$, $\bar{e}(\lambda)$, $\bar{f}(\lambda)$) and satisfy the conditions (A1) or (A2). For the case of equations (A1), this means that:

$$\int_0^\infty \bar{t}_1(\lambda)\bar{t}_2(\lambda)d\lambda = \int_0^\infty \bar{t}_1(\lambda)\bar{t}_3(\lambda)d\lambda = \int_0^\infty \bar{t}_2(\lambda)\bar{t}_3(\lambda)d\lambda = 0$$

$$\int_0^\infty [\bar{t}_1(\lambda)]^2 d\lambda = \int_0^\infty [\bar{t}_2(\lambda)]^2 d\lambda = \int_0^\infty [\bar{t}_3(\lambda)]^2 d\lambda = K \quad (A6)$$

with the same constant K as in (A1). The discrete case (A2) is similar. Suppose the colors $S_1$, $S_2$ have the $T_1 T_2 T_3$ coordinates $(T_{1,1}, T_{2,1}, T_{3,1})$ and $(T_{1,2}, T_{2,2}, T_{3,2})$ respectively. Then the dot product (A5) is the same as $$<S_1,S_2>=T_{1,1}T_{1,2}+T_{2,1}T_{2,2}+T_{3,1}T_{3,2}.$$

The brightness B of a color S can be represented as the length (the norm) of the vector S:

$$B=\|S\|=\sqrt{<S,S>}=\sqrt{D^2+E^2+F^2} \quad (A7)$$

The BEF color coordinate system defines each color by the coordinates (B,E,F). The Bef color coordinate system is defined as follows:

$$B=\sqrt{D^2+E^2+F^2}$$

$$e=E/B$$

$$f=F/B \quad (A8)$$

If B=0 (absolute black color), then e and f can be left undefined or can be defined in any way, e.g. as zeroes.

D is never negative in the visible spectrum, so the D, E, F values can be determined from the B, e, f values as follows:

$$E=e \times B$$

$$F=f \times B$$

$$D=\sqrt{B^2-(e*B)^2-(f*B)^2}=B\sqrt{1-e^2-f^2} \quad (A9)$$

The invention is not limited to the order of the coordinates. The invention is not limited to DEF2, XYZ, or any other color coordinate system as the initial coordinate system. In some embodiments, the orthonormality conditions (A1) or (A2) are replaced with quasi-orthonormality conditions, i.e. the equations (A1) or (A2) hold only approximately. More particularly, CMF's $\bar{t}_1(\lambda)$, $\bar{t}_2(\lambda)$, $\bar{t}_3(\lambda)$ will be called herein quasi-orthonormal with an error at most $\epsilon$ if they satisfy the following conditions:
1. each of $\int_0^\infty \bar{t}_1(\lambda)\bar{t}_2(\lambda)d\lambda$, $\int_0^\infty \bar{t}_1(\lambda)\bar{t}_3(\lambda)d\lambda$, $\int_0^\infty \bar{t}_2(\lambda)\bar{t}_3(\lambda)d\lambda$ is in the interval $[-\epsilon,\epsilon]$, and
2. each of $\int_0^\infty [\bar{t}_1(\lambda)]^2 d\lambda$, $\int_0^\infty [\bar{t}_2(\lambda)]^2 d\lambda$, $\int_0^\infty [\bar{t}_3(\lambda)]^2 d\lambda$ is in the interval $[K-\epsilon, K+\epsilon]$ for positive constants K and $\epsilon$. In some embodiments, $\epsilon$ is 0.3K, or 0.1K, or some other value at most 0.3K, or some other value. Alternatively, the CMF's will be called quasi-orthonormal with an error at most $\epsilon$ if they satisfy the following conditions:
1. each of $$\sum_\lambda \bar{t}_1(\lambda)\bar{t}_2(\lambda), \sum_\lambda \bar{t}_1(\lambda)\bar{t}_3(\lambda), \sum_\lambda \bar{t}_2(\lambda)\bar{t}_3(\lambda)$$

is in the interval $[-\epsilon,\epsilon]$, and
2. each of $$\sum_\lambda [\bar{t}_1(\lambda)]^2, \sum_\lambda [\bar{t}_2(\lambda)]^2, \sum_\lambda [\bar{t}_3(\lambda)]^2$$

is in the interval $[K-\epsilon, K+\delta]$
for positive constants K and $\epsilon$. In some embodiments, s is 0.3K, or 0.1K, or some other value at most 0.3K, or some other value. Orthonormal functions are quasi-orthonormal, but the reverse is not always true. If $\epsilon$=0.1K, the functions and the corresponding CCS will be called 90%-orthonormal. More generally, the functions and the CCS will be called n%-orthonormal if $\epsilon$ is (100-n) % of K. For example, for 70%-orthonormality, $\epsilon$=0.3K. Some embodiments of the present invention use 90%-orthonormal CCS's or 100%-orthonormal CCS's.

APPENDIX B

Contribution of Chromatic Coordinates to Relative Error $\delta S$

The distortion measure $\delta S$ as in (5) combines information on luminance and chrominance, and it may be desirable to controllably distribute this total distortion between the luminance and chrominance coordinates. The inventors studied the impact of the chrominance distortion on the total distortion $\delta S$ in color coordinate systems Bef, xyY, and CIELUV (also known as L*u*v*). The system xyY is based on the 1931 CIE XYZ CCS for a 2° field, i.e.

$$x=X/(X+Y+Z)$$

$$y=Y/(X+Y+Z) \quad (B1)$$

The L*u*v* CCS is defined based on the XYZ CCS as follows:

$$L^*=116(Y/Y_n)^{1/3}-16 \text{ if } Y/Y_n>(6/29)^3$$

$$L^*=(29/3)^3 Y/Y_n \text{ if } Y/Y_n \leq (6/29)^3$$

$$u^*=13L^* \cdot (u'-u'_n)$$

$$v^*=13L^* \cdot (v'-v'_n) \quad (B2)$$

where u', v' are as in (3), $Y_n$ is the Y coordinate of a predefined white color, and $(u'_n, v'_n)$ are the (u', v') values defined by (3) for that predefined color.

More particularly, the inventors studied the relative change OS given a predefined quantization step 0.001 in a chromatic coordinate in the three CCS's. The results of this study are summarized in Table 1 below. The study covered the monochromatic colors whose xyY coordinates x and y are provided in the standard for XYZ CIE 1931. These monochromatic colors are those with wavelengths $\lambda$=360 nm to 830 nm at 1-nm intervals. The Y coordinate was set to 1. The inventors believed that a change in the y coordinate was more significant (likely to produce a larger $\delta S$ value) than a change in x, so only the y changes were investigated. For each color S with xyY coordinates (x,y,Y), the inventors set S'=(x, y+0.001, 1). Then the xyY coordinates of S and S' were converted to DEF2, and $\delta S$ was computed as in (5). The largest $\delta S$ values are shown in the xyY line of Table 1 below. The inventors also computed $\delta S$ for S being the stimulus of the blue phosphor of the standard sRGB monitor (this stimulus provides the largest $\delta S$ value for the sRGB monitor's gamut). The result is given in Table 1.

For the L*u*v* and Bef systems, the inventors used the same set of colors as for xyY, i.e. the monochromatic colors from Table I(3.3.1) of "Color Science" with Y=1 and the blue phosphor sRGB stimulus. For L*u*v*, the chromatic coordinate v* was believed to be more significant than u*. For each color S, the inventors calculated its coordinates (L*, u*, v*), set S'=(L*, u*, v*+0.001), and calculated $\delta S$ in DEF2 as in (5). The results are presented in the L*u*v* row in Table 1.

For Bef, S' was set to (B, e+0.001, f+0.001), and $\delta S$ was calculated. The results are presented in the Bef row in Table 1.

TABLE 1

|      | $B_{sRGB}$ | 700 nm | 440 nm | 405 nm |
|------|------------|--------|--------|--------|
| xyY  | 0.018      | 0.005  | 0.086  | 0.174  |
| L*u*v* | 0.009    | 0.003  | 0.030  | 0.061  |
| Bef  | 0.002      | 0.003  | 0.002  | 0.002  |

The Bef system provided the lowest δS value for all the colors S studied and not only for the colors in Table 1. Of note, the condition (9) is always satisfied for Bef, but not always for xyY and L*u*v*.

On the other hand, in the visible gamut, each of the Bef chromaticity coordinates e, f can change over a longer range, from about −1 to about 1, than each of x, y, u*, and v*. The range for each of e, f can be about three times larger than for u* and v* and about twice larger than for x and y. Therefore, for a given quantization step, each of e, f needs one or two more bits to represent the quantized values than any one of x, y, u*, v*. However, even if the quantization step is tripled to 0.003 for the e and f coordinates to allow the same number of bits for the quantized values, the Bef CCS still favorably compares with xyY and L*u*v* in terms of color distortion. Indeed, if the quantization step is tripled (i.e. set to 0.003) in Bef but not in xyY or L*u*v*, the Bef values in Table 1 will approximately triple (assuming that 6S linearly depends on the quantization step when the quantization step is small; the linear dependence is a reasonable assumption if δS is differentiable with respect to the quantization step at the 0 value of the quantization step). The tripled δS values for Bef will exceed the 6S values for xyY and L*u*v* for some colors, e.g. for 2=700 nm, but the maximum 6S for Bef (i.e. 0.009) will still be below the maximum 6S for each of xyY and L*u*v*. Further, the tripled δS values for Bef never exceed the 0.01 bound of (8). The xyY and L*u*v* values exceed this limit for the 440 and 405 nm wavelengths, and the xyY value exceeds this limit for the $B_{sRGB}$ stimulus. Further, the tripled quantization step d=0.003 still satisfies the upper bound of (11).

With respect to (21), just as it is reasonable to assume that for small d, the value δS is approximately linearly dependent on d (up to the terms of second or higher order in d), it is also reasonable to assume that the value $\|\Delta_{ef}\|/B$ is approximately linearly dependent on de, df and does not exceed a constant times the maximum of de, df:

$$\|\Delta_{ef}\|/B \leq c \cdot \max(de, df) \quad (B3)$$

From Table 1, c=3, and so (20) follows.

The invention claimed is:

1. A computer-implemented method for digital image processing, the method comprising:
   processing, by a computer system, encoded digital data which comprise encoding of digital data representing an image at a plurality of image portions, wherein the image comprises the plurality of image portions, wherein an image at each said image portion has color coordinates $S_1$, $S_2$, $S_3$ in a first color coordinate system (CCS), wherein $S_1 = \sqrt{T_1^2 + T_2^2 + T_3^2}$ $S_2 = T_2/S_1$ $S_3 = T_3/S_1$ $T_1$, $T_2$, $T_3$ are color coordinates in a predefined 70%-orthonormal linear CCS;
   wherein at least for each said image portion whose color coordinate $S_1$ is in a predefined range, the encoded digital data comprise color coordinates $s_1$, $s_2$, $s_3$ such that:
   $s_1 = k_B \cdot (\ln(\alpha S_1) + \beta)$ rounded to an integer, where α and β are predefined constants,
   $s_2 = k_{ef} \cdot S_2/S_1$ rounded to an integer,
   $s_3 = k_{ef} \cdot S_3/S_1$ rounded to an integer,
   wherein $k_{ef}$ is about $3 \cdot k_B$, or $k_{ef}$ is equal to the smallest power of 2 which is greater than or equal to about $3 \cdot k_B$;
   wherein processing the encoded digital data comprises using the encoded digital data to perform at least one of:
   editing the image;
   displaying the image on a display device;
   decoding the encoded digital data.

2. The method of claim 1 wherein the 70%-orthonormal linear CCS is 90%-orthonormal.

3. The method of claim 2 wherein the processing comprises editing the image.

4. The method of claim 2 wherein the processing comprises displaying the image on a display device.

5. The method of claim 2 wherein the processing comprises decoding the encoded digital data.

6. The method of claim 1 wherein the 70%-orthonormal linear CCS is 100%-orthonormal.

7. The method of claim 6 wherein the processing comprises editing the image.

8. The method of claim 6 wherein the processing comprises displaying the image on a display device.

9. The method of claim 6 wherein the processing comprises decoding the encoded digital data.

10. The method of claim 1 wherein the processing comprises editing the image.

11. The method of claim 1 wherein the processing comprises displaying the image on a display device.

12. The method of claim 1 wherein the processing comprises decoding the encoded digital data.

13. A computer system to perform the method of claim 1.

14. A computer system to perform the method of claim 2.

15. A computer system to perform the method of claim 6.

16. A computer system to perform the method of claim 10.

17. A computer system to perform the method of claim 11.

18. A computer system to perform the method of claim 12.

19. A non-transitory computer-readable manufacture storing a computer-readable program that if executed causes a computer to perform the method of claim 1.

20. A non-transitory computer-readable manufacture storing a computer-readable program that if executed causes a computer to perform the method of claim 2.

21. A non-transitory computer-readable manufacture storing a computer-readable program that if executed causes a computer to perform the method of claim 6.

22. A non-transitory computer-readable manufacture storing a computer-readable program that if executed causes a computer to perform the method of claim 10.

23. A non-transitory computer-readable manufacture storing a computer-readable program that if executed causes a computer to perform the method of claim 11.

24. A non-transitory computer-readable manufacture storing a computer-readable program that if executed causes a computer to perform the method of claim 12.

* * * * *